United States Patent
Hering et al.

(10) Patent No.: US 8,321,524 B2
(45) Date of Patent: Nov. 27, 2012

(54) METHOD FOR OBTAINING ELECTRONIC VEHICLE IDENTIFICATION NUMBER (VIN)

(75) Inventors: Carl J. Hering, Farmington Hills, MI (US); Nathan Ampunan, Novi, MI (US)

(73) Assignee: General Motors LLC, Detroit, MI (US)

( * ) Notice: Subject to any disclaimer, the term of this patent is extended or adjusted under 35 U.S.C. 154(b) by 538 days.

(21) Appl. No.: 11/532,273

(22) Filed: Sep. 15, 2006

(65) Prior Publication Data
US 2008/0071882 A1    Mar. 20, 2008

(51) Int. Cl.
*G06F 15/16* (2006.01)
(52) U.S. Cl. ............... 709/217; 709/219; 340/426.1
(58) Field of Classification Search ............ 709/217, 709/219, 225; 701/2, 101–115; 340/995.1, 340/426.1; 348/211.3
See application file for complete search history.

(56) References Cited

U.S. PATENT DOCUMENTS

| | | | |
|---|---|---|---|
| 5,675,490 A * | 10/1997 | Bachhuber | 701/32 |
| 6,028,537 A * | 2/2000 | Suman et al. | 340/988 |
| 6,134,489 A * | 10/2000 | Smedley | 701/35 |
| 6,437,690 B1 * | 8/2002 | Okezie | 340/505 |
| 6,915,126 B2 * | 7/2005 | Mazzara, Jr. | 455/411 |
| 6,965,326 B2 * | 11/2005 | Allison | 340/999 |
| 7,035,631 B2 * | 4/2006 | Schwinke et al. | 455/420 |
| 2004/0064221 A1 * | 4/2004 | DePrez et al. | 701/2 |
| 2005/0017851 A1 * | 1/2005 | Allison | 340/425.5 |
| 2006/0202799 A1 * | 9/2006 | Zambo et al. | 340/5.72 |
| 2006/0235579 A1 * | 10/2006 | Oesterling et al. | 701/1 |
| 2006/0250272 A1 * | 11/2006 | Puamau | 340/825.69 |
| 2007/0096940 A1 * | 5/2007 | Laranang et al. | 340/825.72 |
| 2008/0228346 A1 * | 9/2008 | Lucas et al. | 701/33 |

OTHER PUBLICATIONS

Prior Art Statement signed by James D. Stevens, dated Nov. 24, 2009.

* cited by examiner

*Primary Examiner* — David Lazaro
*Assistant Examiner* — Marie Georges Henry
(74) *Attorney, Agent, or Firm* — Anthony L. Simon; Reising Ethington P.C.

(57) ABSTRACT

A method for obtaining an electronic Vehicle Identification Number (VIN) from a vehicle. According to one embodiment, an electronic VIN request is generated at the vehicle through a vehicle user interface, such as a visual display, a microphone, a speaker, a keypad, or an electronic control or button. According to another embodiment, the electronic VIN request is generated at an entity, such as a remote call center, that is remotely located from the vehicle. In either case, the electronic VIN request causes the vehicle hardware to query one or more vehicle electronic module(s) for electronic VIN (s) stored therein, so that output related to the electronic VIN(s) can be provided.

17 Claims, 3 Drawing Sheets

METHOD FOR OBTAINING ELECTRONIC VEHICLE IDENTIFICATION NUMBER (VIN)

TECHNICAL FIELD

The present invention generally relates to an electronic Vehicle Identification Number (VIN), and more particularly, to methods and techniques for obtaining an electronic VIN that is stored in a vehicle electronic module.

BACKGROUND OF THE INVENTION

A Vehicle Identification Number (VIN) is used to uniquely identify a motor vehicle by specifying some of its various attributes, such as its make, model, and sequential number. Depending on the particular format used, a VIN in North America typically consists of seventeen alphanumeric characters (excluding the letters I, O and Q): three characters for a manufacturer identification, five characters for vehicle attributes, a check digit character, a model year character, a plant code character, and six characters for a sequential number. To assist in the identification of vehicles and to help prevent vehicle theft, VINs are typically affixed to different parts of the vehicle. For instance, it is common to find a small metal plaque, a sticker or an etching that bears the VIN on the dashboard near the point where it meets the front windshield, on the driver side front door, on a rear wheel-well, on the engine, or on some other part of the vehicle. Placing the VIN in these known locations enables, among other things, the authorities to uniquely identify a particular vehicle.

Car thieves have been known to walk through parking lots or other structures and record the VINs of non-stolen vehicles that happen to have the same make, model and year as vehicles that they have already stolen. The thieves will then replace the original plaques, stickers, or etchings on the stolen vehicle with new, authentic-looking ones bearing the newly acquired 'valid' VIN. This process is known as 'VIN cloning', and it is intended to allow car thieves to pass off a stolen vehicle as non-stolen.

SUMMARY OF THE INVENTION

According to one aspect of the invention, there is provided a method for obtaining an electronic Vehicle Identification Number (VIN) from a vehicle. This method generally comprises the steps of: (a) receiving a request from a vehicle user interface for an electronic VIN, (b) sending a query to a vehicle electronic module for the electronic VIN, (c) receiving the electronic VIN from the vehicle electronic module, and (d) providing output related to the electronic VIN.

According to another aspect, there is provided a method for obtaining an electronic VIN from a remotely located vehicle.

According to yet another aspect, there is provided a system for validating a VIN that generally comprises a vehicle, a call center, and a wireless carrier system. Initiation of an electronic VIN response causes: i) the electronic VIN to be sent from a vehicle electronic module to a telematics unit over a communications bus, ii) the electronic VIN to be wirelessly sent from the telematics unit to the call center over the wireless carrier system, and iii) the electronic VIN to be evaluated against account information stored at the call center.

BRIEF DESCRIPTION OF THE DRAWINGS

Preferred exemplary embodiments of the present invention will hereinafter be described in conjunction with the appended drawings, wherein like designations denote like elements, and wherein.

DETAILED DESCRIPTION OF THE PREFERRED EMBODIMENTS

The system and methods described below can be used to conveniently obtain an electronic VIN from one or more electronic modules located throughout the vehicle. The electronic VIN can then be provided to a designated recipient, such as an authorized vehicle user, a car dealership, or a remotely located call center, in order to verify the true identity of the vehicle. This, in turn, can reduce instances of 'VIN cloning' or other acts where individuals affix plaques, stickers, etchings or other indicia-bearing objects having valid VINs to stolen vehicles.

Communications System—

Figure 1:
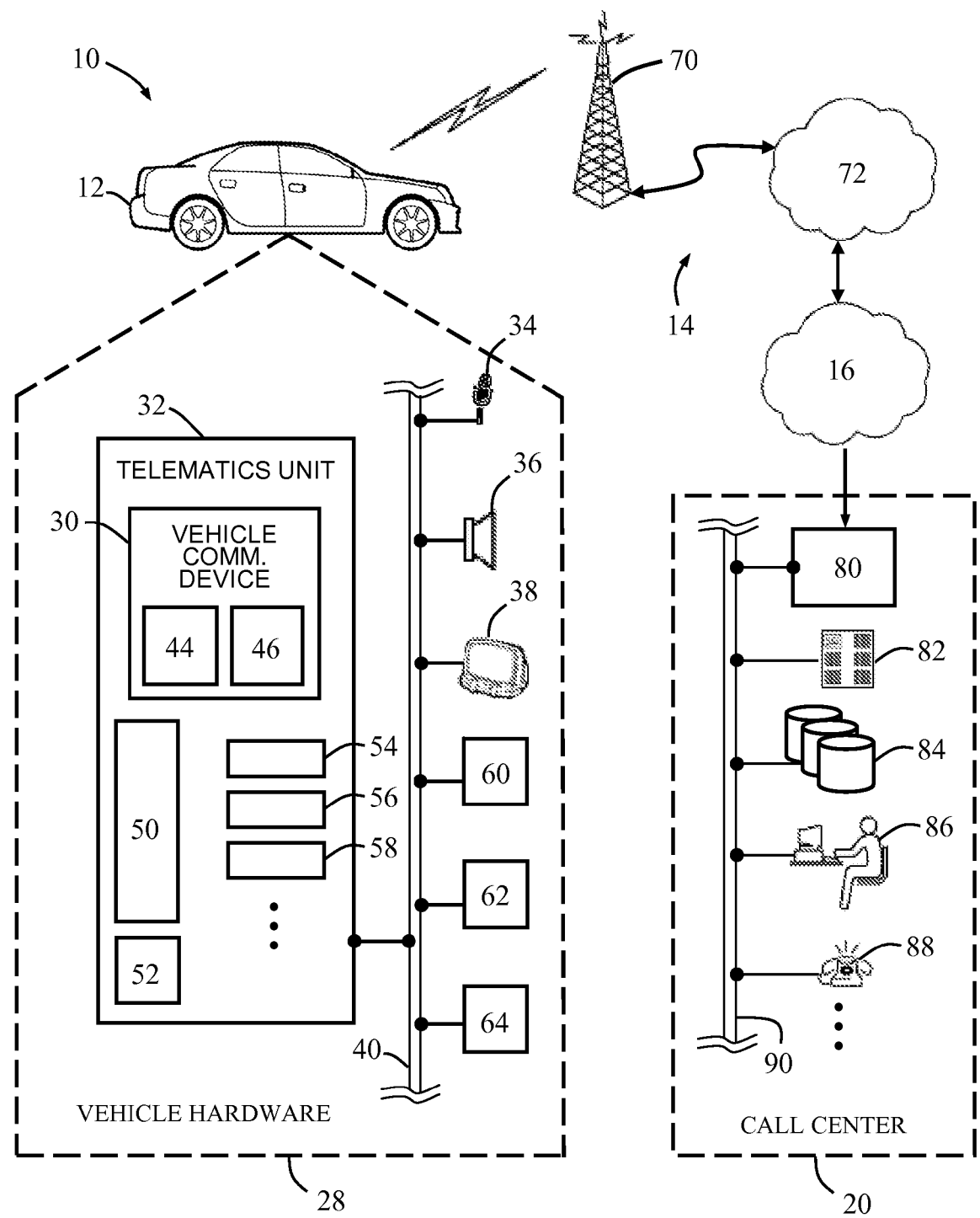
FIG. 1 is a block diagram of a system that is capable of utilizing the method for obtaining an electronic VIN that is disclosed herein.

Turning now to FIG. 1, there is shown an example of a communications system 10 that is capable of performing the methods for obtaining an electronic VIN discussed below. Communications system 10 generally includes a vehicle 12, a wireless carrier system 14, a communications land network 16, and a call center 20. It should be appreciated that the overall architecture, setup and operation, as well as the individual components, of a system such as that shown here are generally known in the art. Thus, the following paragraphs simply provide a brief overview of one such exemplary communication system 10, however, other systems not shown here could employ the disclosed methods as well.

Vehicle 12 is preferably a mobile vehicle such as a motorcycle, car, truck, recreational vehicle (RV), boat, plane, etc., and is equipped with suitable hardware and software that enables it to communicate over system 10. Some of the vehicle hardware 28 is shown generally in FIG. 1 and includes a telematics unit 32, a microphone 34, a speaker 36, a visual display 38, and several vehicle electronic modules (VEMs) 60-64 that are interconnected using a network connection or communications bus 40. Examples of suitable network connections include a controller area network (CAN), a media oriented system transfer (MOST), a local interconnection network (LIN), an ethernet, and other appropriate connections such as those that conform with known ISO, SAE and IEEE standards and specifications, to name but a few.

The telematics unit 32 includes a vehicle communication device 30 that enables the telematics unit to communicate with the call center 20. Vehicle communications device 30 preferably uses radio transmissions to establish a communications channel (a voice channel and/or a data channel) with wireless carrier system 14 so that both voice and data transmissions can be sent and received over the channel. By providing both voice and data communication, vehicle communications device 30 enables the vehicle to offer a number of different services including those related to navigation, telephony, emergency assistance, diagnostics, infotainment, surveys, etc. According to one embodiment, vehicle communications device 30 includes a standard cellular chipset 44 for voice communications like hands-free calling, and a modem 46 for data transmission. In order to enable successful data transmission over a voice channel, for instance, modem 46 can apply some type of encoding or modulation to convert the digital data so that it can communicate through a vocoder or speech codec incorporated in chipset 44. Any suitable encoding or modulation technique that provides an acceptable data rate and bit error rate can be used with the disclosed methods.

The telematics unit 32 is an onboard device that provides a variety of services through its communication with call center 20, and generally includes an electronic processing device 50, one or more types of electronic memory 52, and a number of function-specific devices or modules 54-58. The telematics unit 32 can provide a variety of different services including, for example: vehicle emissions data reporting; turn-by-turn directions and other navigation-related services which are provided in conjunction with a GPS-based vehicle navigation unit 54; airbag deployment notification and other emergency or roadside assistance-related services which are provided in connection with various sensors and modules 56 located throughout the vehicle; and infotainment-related services where music, webpages, movies, television programs, videogames and/or other information is downloaded by an infotainment center 58 and stored for current or later playback. The above-listed services are by no means an exhaustive list of all of the capabilities of telematics unit 32, as should be appreciated by those skilled in the art, but are simply an illustration of some of the services that the telematics unit is capable of offering. It is anticipated that telematics unit 32 will include a number of known components in addition to those listed above. The construction and operation of a suitable vehicle mounted telematics unit that can provide the above-identified services is already known and will not be reiterated here.

Vehicle hardware 28 also includes a number of vehicle user interfaces 34-38 that provide vehicle occupants with a means of providing and/or receiving information. As used herein, the term 'vehicle user interface' broadly includes any suitable form of electronic device, including both hardware and software components, which is located on the vehicle and enables a vehicle user to directly communicate with or through a component of the vehicle. Some examples of vehicle user interfaces include microphone 34, speaker 36, and visual display 38. These devices allow a vehicle user to input commands, receive audio/visual feedback, and provide voice communications, to name but some of the possibilities. Microphone 34 provides an occupant with a means for inputting verbal or other auditory information, and can be connected to an automated voice processing unit utilizing human-machine interface (HMI) technology known in the art. Conversely, speaker 36 provides verbal output to a vehicle occupant and can be a dedicated, stand-alone speaker or part of the vehicle audio system. In either event, microphone 34 and speaker 36 enable vehicle hardware 28 and call center 20 to communicate with the occupants through audible speech. Visual display 38 is preferably a graphics display, such as a touch screen on the instrument panel or a heads-up display reflected off of the windshield, and can be used to provide a multitude of input and output functions. Of course, numerous other vehicle user interfaces can also be used, as the aforementioned interfaces are only examples of some of the possibilities. Furthermore, it should be appreciated that the vehicle user interface described herein can, for instance, be a single component, a combination of components, incorporated within telematics unit 32, or a separate component independent of the telematics unit.

The vehicle electronic modules (VEMs) 60-64 are generally electronic hardware components that are located throughout the vehicle and typically receive input from one or more sensors and use the sensed input to perform diagnostic, monitoring, control, reporting and/or other functions. Each of the VEMs 60-64 is preferably connected by communications bus 40 to the other VEMs, as well as to the telematics unit 32, and can include electronic memory for storing an electronic VIN. As examples, VEM 60 can be an engine control module (ECM) that controls various aspects of engine operation such as fuel ignition and ignition timing, VEM 62 can be a body control module that that governs various electrical components located throughout the vehicle, like the vehicle's power door locks and headlights, and VEM 64 can be an instrument cluster module that processes information such as vehicle speed, engine speed (RPM), mileage, etc. According to one embodiment, the memory used to store the electronic VIN is a one-time write memory device that is written during vehicle assembly and cannot be subsequently overwritten. As is appreciated by those skilled in the art, the above-mentioned VEMs are only examples of some of the modules that may be used in vehicle 12, as numerous others are also possible.

Wireless carrier system 14 is preferably a cellular telephone system, but could be any other suitable wireless system, such as a satellite-based system, that transmits signals between the vehicle hardware 28 and call center 20. According to an exemplary embodiment, wireless carrier system 14 includes one or more cell towers 70, base stations and/or mobile switching centers (MSCs) 72, as well as any other networking components required to connect the wireless system 14 with land network 16. As is appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements. Preferably, a speech codec or vocoder is incorporated in one or more of the base stations, but depending on the particular architecture of the wireless network, it could be incorporated within the MSC or some other network component as well.

Land network 16 can be a conventional land-based telecommunications network that is connected to one or more landline telephones and connects wireless carrier network 14 to call center 20. For example, land network 16 can include a public switched telephone network (PSTN) and/or a network configured with a TCP/IP protocol suite, as is appreciated by those skilled in the art. Of course, one or more segments of land network 16 could be implemented through the use of a standard wired network, a fiber or other optical network, a cable network, power lines, other wireless networks such as wireless local area networks (WLANs) or networks providing broadband wireless access (BWA), or any combination thereof. Furthermore, call center 20 need not be connected via land network 16, but could include wireless telephony equipment so that it can communicate directly with wireless network 14.

Call center 20 is designed to provide the vehicle hardware 28 with a number of different system back-end functions and, according to the exemplary embodiment shown here, generally includes one or more switches 80, servers 82, databases 84, live advisors 86, as well as a variety of other telecommunication and computer equipment 88 that is known in the art. These various call center components are preferably coupled to one another via a wired or wireless local area network 90. Switch 80, which can be a private branch exchange (PBX) switch, routes incoming signals so that voice transmissions are usually sent to either the live adviser 86 or an automated response system, and data transmissions are passed on to a modem or other piece of equipment 88 for demodulation and further signal processing. The modem preferably includes an encoder, as previously explained, and can be connected to various devices such as a server 82 and database 84. Database 84 could be designed to store account information such as recorded VINs, subscriber authentication information, profile records, behavioral patterns, and other pertinent subscriber information. Data transmissions may also be conducted by wireless systems, such as, for example 802.11x, GPRS, and the like. Although the illustrated embodiment has been described as it would be used in conjunction with a manned call center 20, it will be appreciated that the call center can utilize an unmanned automated call response system and, in general, can be any central or remote facility, manned or unmanned, mobile or fixed, to or from which it is desirable to exchange voice and data transmissions.

Methods for Obtaining an Electronic VIN—

Figure 2:
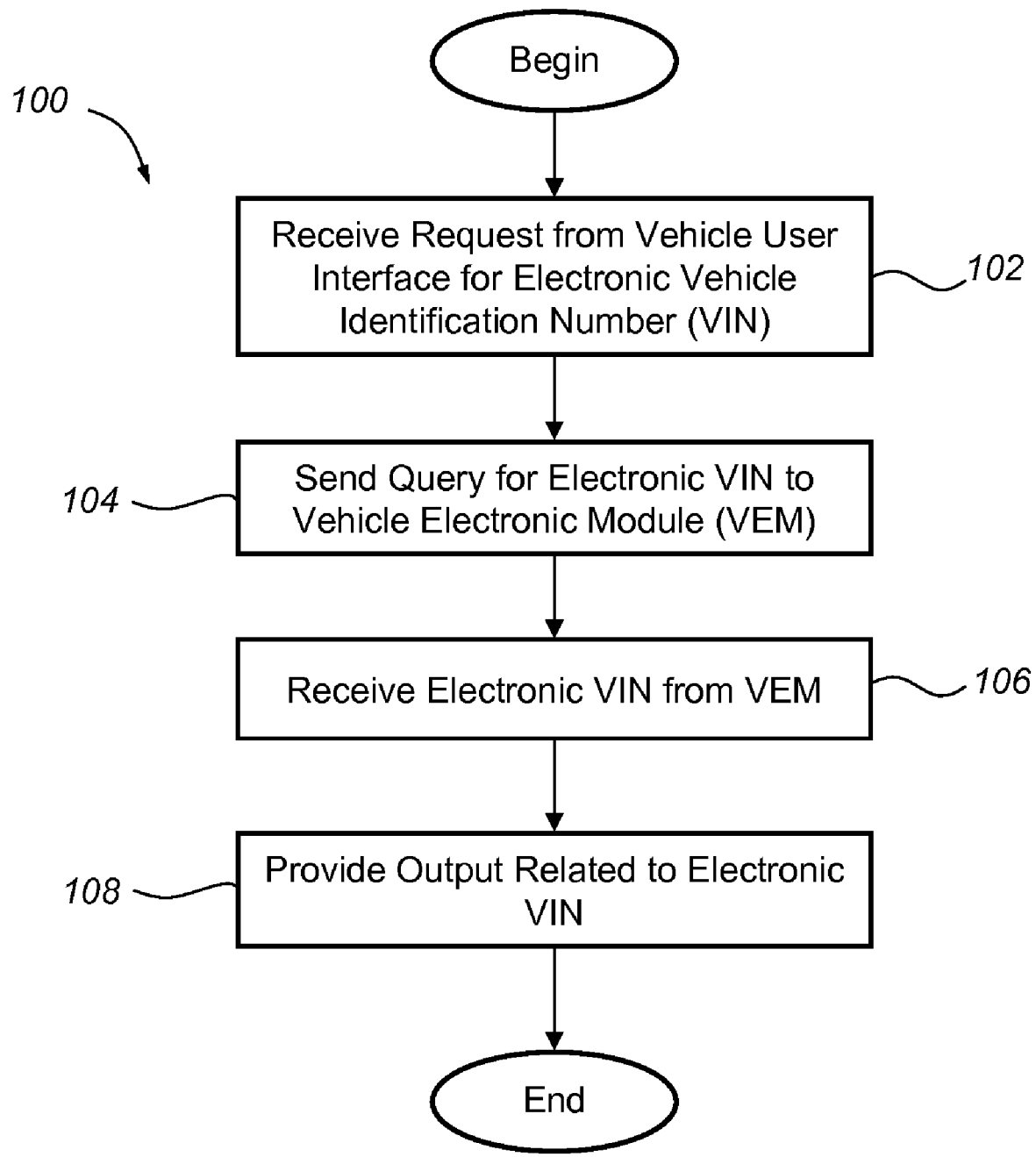
FIG. 2 is a flowchart showing some of the steps of an embodiment of a method for obtaining an electronic VIN from a vehicle.

Turning now to FIG. 2, there is shown a flowchart demonstrating some of the steps of a method 100 for obtaining an electronic VIN from a vehicle. It should be appreciated that, while the following description is in the context of a vehicle user who is physically with the vehicle and directly interacts with a vehicle user interface to request an electronic VIN, other scenarios are certainly possible. The term 'electronic VIN' broadly includes all electronic information that is representative of a Vehicle Identification Number (VIN).

Beginning with step 102, the vehicle hardware 28 receives a request for an electronic VIN from at least one vehicle user interface 34-38. For instance, the vehicle user can engage a button, switch, or other control on the instrument panel to activate microphone 34 and access some type of automated voice processing unit utilizing a human machine interface (HMI). Once accessed, the vehicle user can simply request in a hands-free manner that the vehicle return an electronic VIN. According to another example, the vehicle user can interact with a visual display 38, such as an audio/graphics display, a touch screen, or a heads-up display, in order to indicate that he or she is requesting the vehicle's electronic VIN. It should, of course, be appreciated that alternative modes of requesting an electronic VIN via a vehicle user interface, other than those provided above, are certainly possible.

Once the electronic VIN request has been received from the vehicle user interface, a query is sent to at least one of the vehicle electronic modules (VEMs) 60-64 for the electronic VIN, step 104. The query could originate with telematics unit 32 or with some other vehicle hardware component, and preferably causes the VEM(s) 60-64 to put the electronic VIN on communications bus 40. According to one embodiment, the query for the electronic VIN is only sent to one VEM, which could be the engine control module 60, a powertrain control module 62, or a body control module 64, to name but a few. According to another approach, the query is sent to a number of VEMs so that they each return the electronic VIN stored in their memory device. In this scenario, it is expected that each of the VEMs will return the same electronic VIN because they are all installed on the same vehicle; however, if one or more of the modules have been tampered with, replaced, etc., then there could be a discrepancy between their VINs. According to yet another embodiment, the query of step 104 is sequentially sent to a number of VEMs 60-64 until one of them returns a response that includes an electronic VIN. Again, the foregoing examples are simply some of the possible methods that could be used to query one or more VEMs for electronic VINs stored therein.

In step 106, an electronic VIN is received from one or more VEM(s) 60-64 and, depending upon the particular application, can be analyzed and compared to determine its validity. For example, if a number of VEMs are queried in the previous step so that they each return an electronic VIN, those VINs can be compared to one another or they can be compared to account information which is stored at the vehicle, at call center 20, or at some other location. In one embodiment, the electronic VIN received from a first VEM is compared to an electronic VIN received from a second VEM to determine if they match. Discrepancies between the electronic VINs stored in the first and second VEMs can indicate that a VEM has been tampered with, stolen or mistakenly installed in vehicle 12. According to another embodiment, the electronic VIN(s) received from one or more VEM(s) can simply be outputted without any analysis or processing. It should be pointed out that the electronic VINs can be received by telematics unit 32 or by some other vehicle hardware component, and that the comparisons and analyses discussed above can be performed at the vehicle or at a remotely located facility.

Next, output related to the electronic VIN is provided according to one of a number of different techniques, step 108. 'Output related to the electronic VIN' can include one or more actual electronic VIN(s), segments of the electronic VIN(s), results from comparisons and/or analyses performed on the electronic VIN(s), other uniquely identifying information associated with the electronic VIN(s) (mobile dialing number (MDN), mobile identification number (MIN), user account number, electronic serial number (ESN), etc.), or any combination thereof. For instance, if all the electronic VINs provided by the various VEMs match one another, then the output could simply include a message stating that the electronic VIN has been verified (results from comparisons and/or analyses). If, on the other hand, the electronic VINs do not match one another, then the output could include a message indicating that there is a discrepancy between the VINs and that the vehicle user should contact call center 20. In addition to there being a variety of different forms of output, there are a number of different ways in which that output can be conveyed, including providing the output to multiple recipients.

According to one embodiment, the output is directly conveyed to a vehicle user via a vehicle user interface 34-38. For example, the electronic VIN can be visually presented to the user on visual display 38, or it can be audibly presented by playing it through speaker 36, to cite but a few possibilities. In another embodiment, the output related to the electronic VIN is wirelessly sent to a remote entity, such as call center 20, using wireless carrier system 14. The remote entity can then compare the electronic VIN(s) to one another or to stored account information to determine the consistency of the numbers. By comparing the electronic VIN that was electronically gathered from the vehicle with the VIN stored in the account information, call center 20 is able to verify the authenticity and/or validity of the numbers. Inconsistent numbers may indicate a stolen vehicle, VEM 60-64, or telematics unit 32, or an error in the account information. Furthermore, output related to the electronic VIN, can be conveyed by sending a communication such as a wired or wireless voice connection, or an electronic message such as a text message, instant message, or email.

Method 100 can further include additional steps if desired. As an example, once the electronic VIN-related output in step 108 is provided to a user, the user can automatically or manually compare it with one or more VIN(s) physically affixed to the vehicle to determine if the affixed VIN(s) are valid. If the electronic VIN does not match the affixed VIN(s), then the result of the comparison may suggest that the affixed VIN(s) are invalid and have been illegally installed. In any event, method 100 could further include a step of automatically notifying the call center 20 of the results, and the call center could optionally inform a third party, such as a police department or the registered owner of the vehicle.

Figure 3:
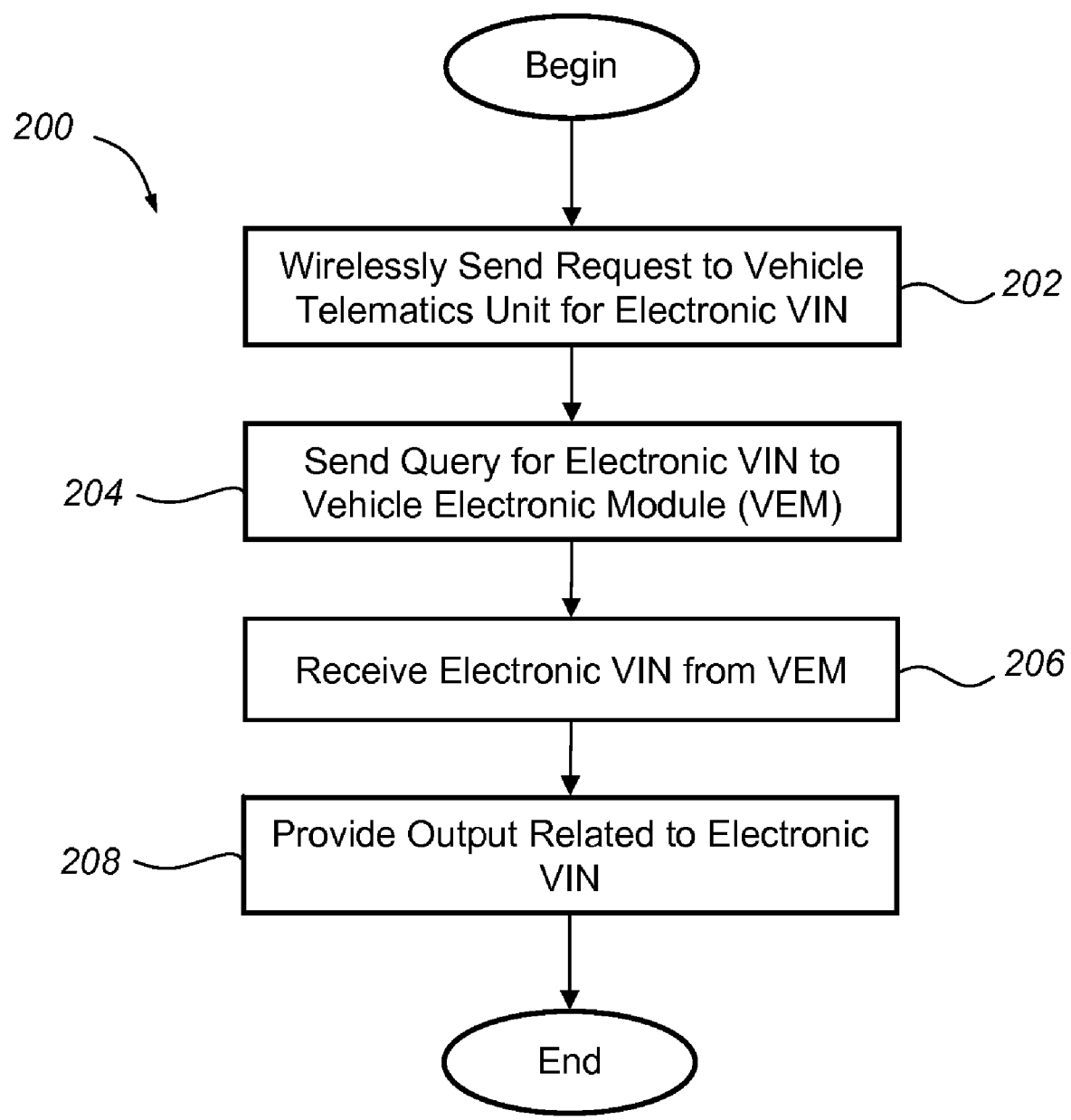
FIG. 3 is a flowchart showing some of the steps of another embodiment of a method for obtaining an electronic VIN from a vehicle which in this embodiment, is remotely located from the entity that is attempting to obtain the VIN.

With reference to FIG. 3, there is shown an embodiment of the present method 200 where an electronic VIN is obtained from a remotely located vehicle 12. Beginning with step 202, a request for an electronic VIN is wirelessly sent from call center 20 to vehicle telematics unit 32. This request can originate from one of a number of different sources. For instance, a user can initiate the electronic VIN request by first contacting call center 20 via a wired voice connection, a wireless voice connection, or an electronic message such as a text message, instant message, or email, and instructing the call center to place the request with vehicle 12. In the voice connection examples, it is preferable that the user engage an automated voice processing unit utilizing a human-machine interface (HMI). According to another embodiment, a user (which is preferably a subscriber of certain vehicle telematics-related services) initiates the electronic VIN request by engaging a web-based interface that is associated or in some way connected with call center 20. An example of such an interface is a webpage hosted by one of the servers located at call center 20. Requests initiated through call center 20 are wirelessly sent from the call center to the vehicle telematics unit 32 over wireless carrier system 14.

In response to the request being received at vehicle telematics unit 32, a query is sent to one or more of the VEM(s) 60-64 requesting the electronic VIN, step 204. Next, VEM(s) send one or more electronic VIN(s) back to a component of the vehicle hardware 28, step 206. In some instances the hardware component that receives the electronic VINs is the vehicle telematics unit 32; this is especially true when the results of that query are to be wirelessly transmitted back to call center 20 or some other remote location. At step 208, an output related to the electronic VIN is provided and, as described above in connection with step 108, that output can either be conveyed to a vehicle user located with the vehicle, or it can be wirelessly transmitted to a remote entity such as call center 20. It should be appreciated that the various embodiments described in conjunction with steps 104-108 apply as well to steps 204-208 and are therefore not reiterated here. Stated differently, method 200 involves the processing of an electronic VIN request that is generated away from the vehicle (as opposed to being generated at the vehicle in method 100), however, in both cases the output that is related to the electronic VIN(s) can be provided to recipients located anywhere.

It is to be understood that the foregoing description is not a definition of the invention itself, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example", "for instance", "like", and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for obtaining an electronic Vehicle Identification Number (VIN) from a vehicle, comprising the steps of:
    (a) receiving a VIN identifying a vehicle via a vehicle user interface located in the vehicle;
    (b) querying a plurality of vehicle electronic modules in connection with receiving the VIN identifying the vehicle, wherein each of the plurality of vehicle electronic modules is located on the same vehicle and stores an electronic VIN;
    (c) receiving replies from the plurality of vehicle electronic modules in response to the query, wherein each of the plurality of vehicle electronic modules provides their stored electronic VIN so that a comparison can be made of the VIN received at step (a) and the stored electronic VINs; and
    (d) presenting output related to the comparison via a vehicle hardware component.

2. The method of claim 1, wherein the vehicle hardware component is a vehicle user interface that includes at least one device selected from the group consisting of: a visual display, a microphone, a speaker, a keypad, and an electronic control or button.

3. The method of claim 2, wherein the vehicle user interface is a microphone coupled to an automated voice processing unit utilizing a human-machine interface (HMI).

4. The method of claim 1, wherein the plurality of vehicle electronic modules includes at least one module selected from the group consisting of: an instrument cluster module, a body control module, an engine control module, and a powertrain control module.

5. The method of claim 1, wherein the output in step (d) includes the actual VIN.

6. The method of claim 1, wherein the output in step (d) includes results of a comparison between a first electronic VIN received from a first vehicle electronic module and a second electronic VIN received from a second vehicle electronic module, wherein the comparison is performed at the vehicle.

7. The method of claim 1, wherein the output in step (d) is provided via a vehicle hardware component in the form of a vehicle user interface so that it can be conveyed to a vehicle user that is located at the vehicle.

8. The method of claim 7, further comprising:
    (e) comparing the output conveyed in step (d) to a VIN affixed to the vehicle to determine if the affixed VIN is valid.

9. The method of claim 1, wherein the output in step (d) is provided via a vehicle hardware component in the form of a vehicle telematics unit so that it can be wirelessly sent to a call center that is remotely located from the vehicle.

10. A method for obtaining an electronic Vehicle Identification Number (VIN) from a remotely located vehicle, comprising the steps of:
    (a) receiving at a call center a VIN identifying a vehicle;
    (b) wirelessly sending a request for an electronic VIN from the call center to a vehicle telematics unit of the remotely located vehicle;
    (c) sending a query for the electronic VIN from the vehicle telematics unit to at least one vehicle electronic module over a communications bus in connection with receiving at the call center the VIN identifying the vehicle;

(d) receiving the electronic VIN from the at least one vehicle electronic module at a vehicle hardware component over the communications bus;
(e) comparing the VIN identifying the vehicle with the electronic VIN; and
(f) determining whether the VIN identifying the vehicle matches the electronic VIN.

11. The method of claim 10, wherein the VIN identifying the vehicle is received via a web-based interface.

12. The method of claim 10, wherein the request in step (b) is generated in response to user interaction with an automated voice processing unit utilizing a human-machine interface (HMI).

13. The method of claim 10, wherein the vehicle electronic module includes at least one module selected from the group consisting of: an instrument cluster module, a body control module, an engine control module, and a powertrain control module.

14. The method of claim 10, wherein the query in step (c) is sent from the vehicle telematics unit to a plurality of vehicle electronic modules over the communications bus so that a plurality of electronic VINs are gathered.

15. The method of claim 10, further comprising the step of displaying the received electronic VIN via a vehicle hardware component in the form of a vehicle user interface so that it can be conveyed to a vehicle user that is located at the vehicle.

16. The method of claim 10, wherein the received electronic VIN is provided to a vehicle hardware component in the form of a vehicle telematics unit so that it can be wirelessly sent to the call center.

17. The method of claim 16, further comprising:
carrying out the comparing step at the call center.

* * * * *